United States Patent

Zlotnick et al.

Patent Number: 5,831,936
Date of Patent: Nov. 3, 1998

[54] SYSTEM AND METHOD OF NOISE DETECTION

[75] Inventors: Gregory Zlotnick, Mitzpe; Ehud Naheer, Misqav, both of Israel

[73] Assignee: State of Israel/Ministry of Defense Armament Development Authority - Rafael, Haifa, Israel

[21] Appl. No.: 914,318

[22] Filed: Aug. 18, 1997

Related U.S. Application Data

[63] Continuation of Ser. No. 603,336, Feb. 20, 1996, abandoned.

[30] Foreign Application Priority Data

Feb. 21, 1995 [IL] Israel ........................................ 112730

[51] Int. Cl.$^6$ ....................................................... G01S 3/80
[52] U.S. Cl. ............................................ 367/124; 367/129
[58] Field of Search ................................... 367/118, 124, 367/125, 129; 364/516, 517

[56] References Cited

U.S. PATENT DOCUMENTS

| | | | |
|---|---|---|---|
| 4,333,170 | 6/1982 | Mathews et al. | 367/125 |
| 4,916,453 | 4/1990 | Costas | 367/125 |
| 5,339,281 | 8/1994 | Narendra et al. | 367/118 |
| 5,495,427 | 2/1996 | Puma et al. | 367/125 |
| 5,504,717 | 4/1996 | Sharkey et al. | 367/124 |

FOREIGN PATENT DOCUMENTS

| | | |
|---|---|---|
| 0420792 A2 | 4/1991 | European Pat. Off. . |
| 2196119 | 4/1988 | United Kingdom . |
| WO 92/00530 | 1/1992 | WIPO . |

Primary Examiner—Ian J. Lobo
Attorney, Agent, or Firm—Wilson Sonsini Goodrich & Rosati

[57] ABSTRACT

A noise detection system is provided which includes a receiving unit, a processing unit and a user interface unit connected together. The receiving unit consists of a three-dimensional acoustical array for generally simultaneously receiving a multiplicity of sound signals from different directions. The sound signals have at least one sound source of interest. The processing unit processes the sound signals and consists of a three-dimensional spatial filter for identifying the elevation and azimuth of each of the sound signals, a sound database containing a multiplicity of soundprints of sound sources of interest, apparatus for classifying the sound signals with the soundprints, and apparatus for providing the azimuth and elevation of each of the classified sound signals. The user interface unit indicates to the user the azimuths and elevations of the classified sound signals. The processing unit further consists of filtering apparatus for filtering extraneous noise signals received by the acoustical array.

19 Claims, 5 Drawing Sheets

SYSTEM AND METHOD OF NOISE DETECTION

This application is a continuation of application Ser. No. 08/603,336, filed Feb. 20, 1996 now abandoned.

FIELD OF THE INVENTION

The present invention relates to a system for detecting the direction and location of noise sources generally.

BACKGROUND OF THE INVENTION

Noise is omnipresent and largely unavoidable. Trying to identify a particular noise source amongst the general cacophony is difficult. Though an ambulance siren, for example, can be heard, it is not possible to quickly detect the direction or location of the ambulance itself. The purpose of the siren is to alert cars to move out of the way to allow the ambulance to pass quickly. It is noticeable that, though cars clearly hear the siren, the drivers react slowly as there are unable to identify the direction of the moving ambulance.

In military situations, the ability to accurately identify the direction and location of the source of fire from opposing forces is essential. Small arms fire originating from both a variety of positions and sources poses a major threat to military forces and other protection agencies. Soldiers and security personnel can find themselves engaged by highly trained military marksmen firing from well prepared positions or by rank amateurs firing at them from crowds.

Current detection capabilities which rely primarily on a soldier's eyesight and hearing are largely inadequate for effectively countering this threat, particularly in an environment where rules of engagement preclude any but the most precise and discriminate responses. Detection while operating in vehicles or aircraft is particularly difficult. Soldiers may In fact be unaware that they are under fire unless their vehicle is hit.

Mortars and similar projectiles also pose a significant threat. The small size, high angle trajectory and rapid emplacement and displacement times of these weapons makes them extremely difficult to detect and counter.

In an infantry and artillery battlefield, the soldier is constantly confronted with chaotic noise sources which makes it extremely difficult to correctly and accurately identify firing sources. The knowledge of the directions of these sources is essential for the soldier to aim and shoot effectively.

This scenario is especially aggravated in ambushes, highly echoic conditions, such as in built-up areas, and in the case of circumferential firing. Besides, even with only one source of shooting, the shot noise is comprised of several sounds originating from various locations, confusing the soldier completely. Background noise and squeaks of machinery further confuse the situation and the identification of the firing source may be made completely impossible. The lack of positive detection of firing sources plus the general anxiety prevalent in the battlefield can render the soldier effectively inefficient. His chances of survival are also highly reduced.

SUMMARY OF THE INVENTION

It would be desirable to have a means of detecting and locating noise sources. In military type situations, it is also desirable for the soldier to be able to identify and respond to sources of enemy fire from snipers and small artillery.

It is thus the general object of the present invention to provide a noise detection system, which overcomes the above listed and other deficiencies of conventional methods.

It is the object of the present invention to provide a system for detecting the source and direction of light weapon fire.

According to the invention there is provided a noise detection system including a receiving unit, a processing unit connected to the receiving unit and a user interface unit connected to the processing unit. The receiving unit consists of a three-dimensional acoustical array for generally simultaneously receiving a multiplicity of sound signals from different directions. The sound signals have at least one sound source of interest.

The processing unit processes the sound signals and consists of a three-dimensional spatial filter for identifying the elevation and azimuth of each of the sound signals, a sound database containing a multiplicity of soundprints of sound sources of interest, apparatus for classifying the sound signals with the soundprints, and apparatus for providing the azimuth and elevation of each of the classified sound signals. The user interface unit indicates to the user the azimuths and elevations of the classified sound signals. The processing unit further consists of filtering apparatus for filtering extraneous noise signals received by the acoustical array.

Additionally, in accordance with a preferred embodiment of the present invention, the acoustical array consists of an antenna fitted with a multiplicity of microphones located in a first plane and at least one elevated microphone located in a second plane above the first plane. The multiplicity of microphones are generally equally spaced within the antenna.

Further, in accordance with a preferred embodiment of the present invention, the acoustical array is attached to a head covering which consists of a direction indicator device for indicating the orientation of the acoustical array about a horizontal axis and an angle indicating device for indicating the angle of inclination of the acoustical array.

Additionally, in accordance with a preferred embodiment of the present invention, the user interface unit consists of apparatus for selecting from a plurality of displaying elements. The display element includes apparatus for displaying the identified azimuth and elevation of the classified sound source or is a plurality of light emitting diodes operative to indicate the identified azimuth of the classified sound source.

Additionally, in accordance with a preferred embodiment of the present invention, the spatial filter consists of an annular arrangement of a multiplicity of directional filters and apparatus for searching for a multiplicity of frequencies within a pre-determined time period and for searching for the sound signal, within a pre-determined time period, when the sound signature of the sound signal is known.

Furthermore, there is provided a method for detecting noise including the steps of simultaneously receiving a multiplicity of sound signals, having at least one sound source of interest, from different directions through a three-dimensional acoustical array, processing the sound signals and indicating the azimuths and elevations of the classified sound signals. The step of processing the sound signals consists of the steps of spatially filtering the sound signals, identifying the elevation and azimuth of the sound signals, classifying the soundprint of the sound signals from a sound database containing a multiplicity of soundprints of interest and providing the azimuth and elevation of the classified sound signals. The step of processing the sound signals further consists of the step of filtering extraneous noise signals.

Furthermore, in accordance with a preferred embodiment of the method of the present invention, the step of identifying the elevation and azimuth of the sound signals consists of the step of searching for a multiplicity of frequencies within a pre-determined time period or the step of searching within a pre-determined time period for the sound signal where the sound signature of the sound signal is known.

BRIEF DESCRIPTION OF THE DRAWINGS

These and further construction features of the invention will be better appreciated in the light of the ensuing description of a preferred embodiment thereof, given by way of example only with reference to the accompanying drawings wherein.

DETAILED DESCRIPTION OF A PREFERRED EMBODIMENT

Figure 1:
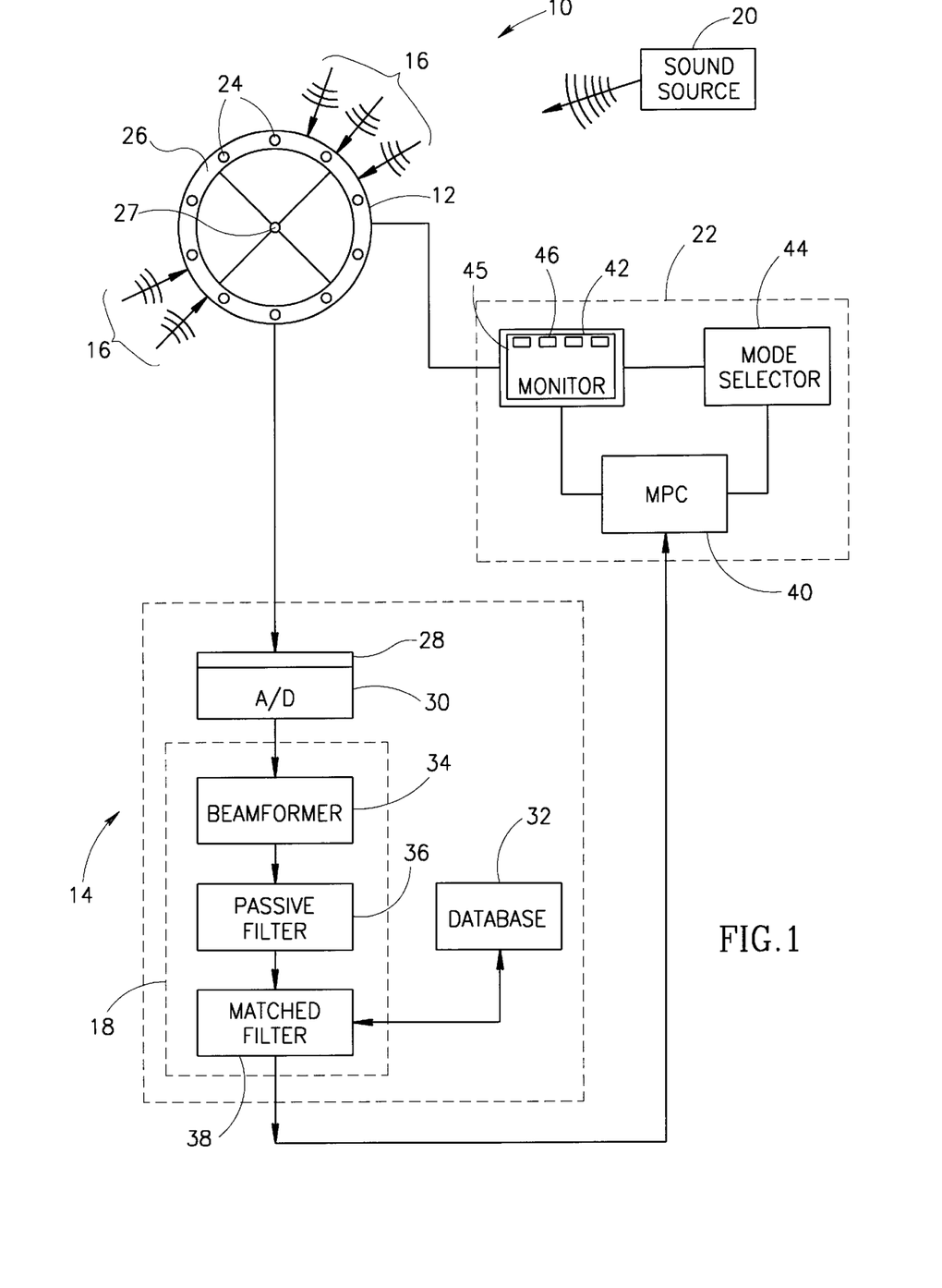
FIG. 1 is a schematic illustration of a noise detection system constructive and operative in accordance with a preferred embodiment of the present invention.

Reference is now made to FIG. 1, which schematically shows the layout of a preferred embodiment of a noise detection system, generally designated 10, constructed and operative according to the teachings of the present invention.

Noise detection system 10 comprises a receiving unit, generally designated 12, connected to a signal processing unit 14. Receiving unit 12 simultaneously receives a plurality of acoustical signals, generally designated 16, from a plurality of directions. Processing unit 14 includes a filtering component, generally designated 18, which is able to separate acoustic signals 16 from different directions and discriminate between types of sound. By reference to a database of sounds of interest, processing unit 14 extracts the sound received from a source of interest 20. A control and display unit 22 connected to processing unit 14, displays the azimuth and distance of the sound source 20 to the user.

Receiving unit 12 comprises a multitude of microphones 24. For example, twelve microphones 24 can be used, each equidistantly spaced within annulus 26, in order to panoramically cover a full 360° circle. At least one additional elevated microphone 27 located at a higher elevation than annulus 26, is used for assessing the elevation and allows for three-dimensional processing. Each of microphones 24 and 27 contain is own preamplifier (not shown) for amplification of the received signals 16.

Signal processing unit 14 is a modular unit capable of detecting the direction of the sound source 20 and processing large amounts of sound data. Processing unit 14 comprises, in addition to a filtering component 18, an analog front end 28 connected to an analog/digital (A/D) converter unit 30 and a sound database 32.

Analog front end 28, of a type known in the art, is based on modules of an amplifier with a primary band-pass filter (not shown), of a type known in the art. Microphones 24 and 27 are connected to analog front end 28 by hard wiring.

Acoustic signals 16 are received simultaneously and panoramically (360°) by microphones 24 and elevated microphone 27 and then converted into digitized signals by A/D converter unit 30 for further processing. A/D converter unit 30 performs the functions of signal amplification, filtering and A/D conversion. Processing unit 14 calculates the height of the sound source and its position relative to microphones 24.

Acoustic signals 16 are passed through filtering component 18 which filters the time history of acoustic signals 16 to isolate and extract sound source of interest 20 from other acoustic signals 16. Filtering component 18 comprises a plurality of filters, consisting of a beamformer 34, a passive filter 36 and a "matched" filter 38.

Beamformer 34 is a spatial filter which provides a multiplicity of beams and beam spectrums, or multi-beam array (MBA). The MBA consists of measurements of the elevation and azimuth of sound sources. For example, beamformer 34 uses 36 independent beams, each having a resolution of 10°, thereby covering a full 360° circle. Thus, the angular direction of a multiplicity of sound signals 16 from different directions at the same time can be isolated. Beamformer 34 translates signals 16, received by microphones 24 and 27, into a three-dimensional matrix consisting of signal energy, bearing and frequency. The output from beamformer 34 consists of a directional power spectrum, that is, the energy distribution as a function of direction in each frequency range.

Beamformer 34 can operate in either of two search modes; time domain mode and frequency domain mode. Frequency domain is used when the acoustical signature of the signal source is known but the identity of the signal is unknown. In this mode, the search is made over the full frequency spectrum, but is restricted to the angular field defined by the signal source. Generally, time domain mode is used, wherein during a pre-determined time period, beamformer 34 continually sweeps the complete circumference of 360° and searches for a multiplicity of frequencies. In the event, that an impulse sound, such as a gun shot, is identified by beamformer 34, the sweep ceases and the location of the impulse sound is calculated and sent to the control and display unit 22.

The method of calculating the azimuth and elevation from the array of signals received by beamformer 34 is described hereinbelow.

Passive filter 36 is a band-pass filter which filters extraneous noises, such as conversation, wind and machinery sounds.

"Matched" filters 38 access database 32 in order to match the "soundprint" of sound signals 16 with sounds of interest stored in database 32. "Matched" filters 38 attempt to correlate the "soundprints" of sound signals 16 with one of the stored sounds of interest. Each sound source of interest 20 produces its own unique "soundprint". A "soundprint" is similar in concept to a fingerprint or DNA structure. Each sound source generates a different combination of sound signals, which uniquely identifies the sound source.

Once a positive identification of the sound source is registered, processing unit 14 sends the information regarding the direction and identity of identified sound source or sources 20 to control and display unit 22.

Control and display unit 22 comprises a microprocessor 40 connected to a display monitor 42 and display mode selector 44. Microprocessor 40 manages and processes data for the display and serves as a man-machine interface.

Noise detection system 10 treats the signal history as a FIFO (first in, first out). Sound sources change location, appear, disappear or reappear frequently in time. A "live period" may be defined as a period during which a sound source is considered "alive". During this "live period" the event is displayed on monitor 42. Older events are stored in the system memory for a pre-determined "storage period", after which they are discarded. The number of events which may be simultaneously displayed and the "live" time period are parameters selectable by the operator.

Display mode selector 44 allows the operator to select one of at least two modes of display to be shown on monitor 42. A first mode of display 45 comprises a multiplicity of light emitting diodes (LEDs) 46, known in the art, arranged around the perimeter of monitor 42 and an alphanumeric capability allowing messages indicating azimuths to be displayed.

Once a positive identification of the sound source direction is registered, processing unit 14 sends the information to monitor 42. If LED display 45 is selected, one of LEDs 46 begins blinking to indicate the direction of the identified sound source 20. Display unit 22 is rotatable about a horizontal axis by the user, allowing the user to accurately locate the position and "lock" on to sound source 20. As display unit 22 is rotated, adjacent LEDs 46 blink. When display unit 22 lines up with the beam which registered the event, LED 46 stops blinking and stays lit permanently. After a pre-determined "live period", LED 46 will be extinguished, ready to display a new event.

Figures 2, 5:
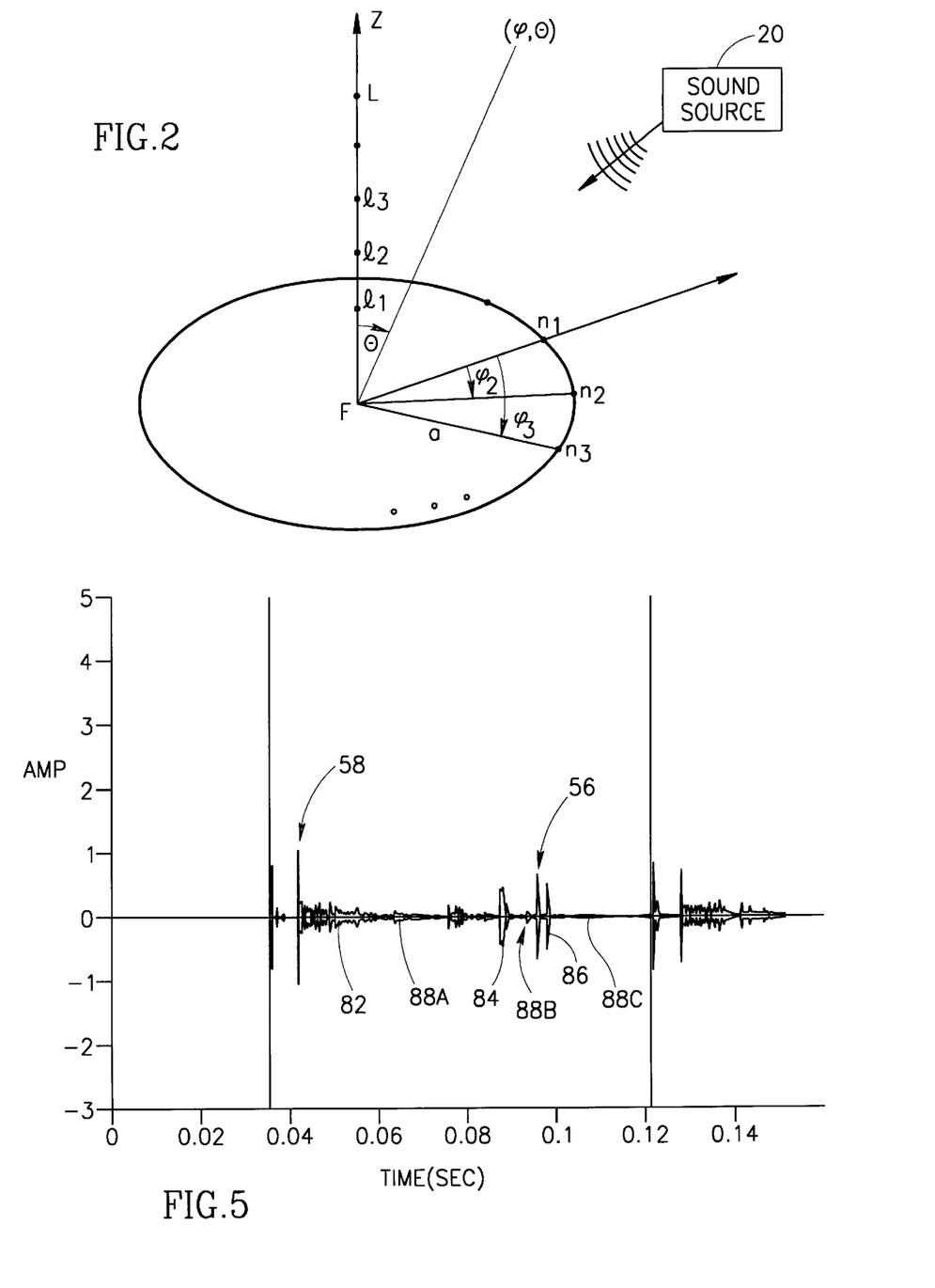
FIG. 2 is a schematic illustration of the coordinate points used for the calculation of the elevation and azimuth of the noise source of the preferred embodiment of the present invention.
FIG. 5 is a display of a typical acoustic signal from a gun shot.

A second mode of display available on display mode selector 44 gives the operator the option of displaying coordinates (not shown), of the identified sound signal, on monitor 42. During the "live period", the graphic direction arrow glows red. After this time, the display changes to green indicating that the display is no longer "live" and is showing the last event stored in memory. After a pre-determined "storage period", during which no further 'live' event has occurred, the event would disappear from monitor 42. Reference is now made to FIG. 2. FIG. 2 illustrates the coordinate points used by the beamformer 34, for calculating the elevation and azimuth of a sound source. The multiplicity of microphones 24 covering the 360° circle, having a radius a, are designated n1, n2,... N. Elevated microphones 27, which are used for measuring the elevation of the sound source, are designated l1, l2, ... L.

Generally, beamformer 34 uses time domain mode, where, within a pre-determined time period, a generalized search is made by beamformer 34. The search covers the full 360° circle and searches for a multiplicity of frequencies.

Even though only one elevation microphone 27 need be installed, the calculation assumes that a plurality of elevation microphones are situated at the central point (F) of the beam array.

In time domain mode, the three-dimensional beam array, for source ($\phi$, $\theta$) is defined by the equation:

$$E_{Az \atop El} = \sum_{n=1}^{N} A_n(t - \tau_n) \quad (1)$$

where: $A_n$ is a vector of the antennae system of the beamforming network;

and where the elevation (El) array is defined by the equation:

$$\tau_n^{El} = (n-1)\frac{d}{c} \cos\theta_b \quad (2)$$

and where the Azimuth (Az) array is defined by the equation:

$$\tau_n^{Az} = \frac{d}{c} \sin\theta_b \cos(\phi_b - \phi_n) \quad (3)$$

where:

c is the velocity of sound, which is corrected for atmospheric conditions;

d is the distance between microphones;

$\theta_b$, $\phi_b$ are the bearing angles in elevation and azimuth;

$\phi_n$ is the angular location of the microphones within the circle, and is defined as:

$$\phi_n = \frac{2\pi}{N_1} (n-1) \quad (4)$$

In frequency domain mode, the three-dimensional beam array for elevation (El) and azimuth (Az), for source ($\phi$, $\theta$) is defined by the following equations (5 and 6 hereinbelow):

Azimuth array (Az):

$$E_{Az} = \sum_{n=1}^{N} \exp(jka[\sin\theta\cos(\phi - \phi_n) - \sin\theta_0\cos(\phi_0 - \phi_n)]) \quad (5)$$

the Elevation array (El):

$$E_{El} = \sum_{l=1}^{L} \exp(jkd(n-1)[\cos\theta - \cos\theta_0]) \quad (6)$$

where: $k = \frac{2\pi}{\lambda}$ (7)

$\lambda$ is the length of the acoustical wave received.

$$j = \sqrt{-1} \quad (8)$$

Figure 3:
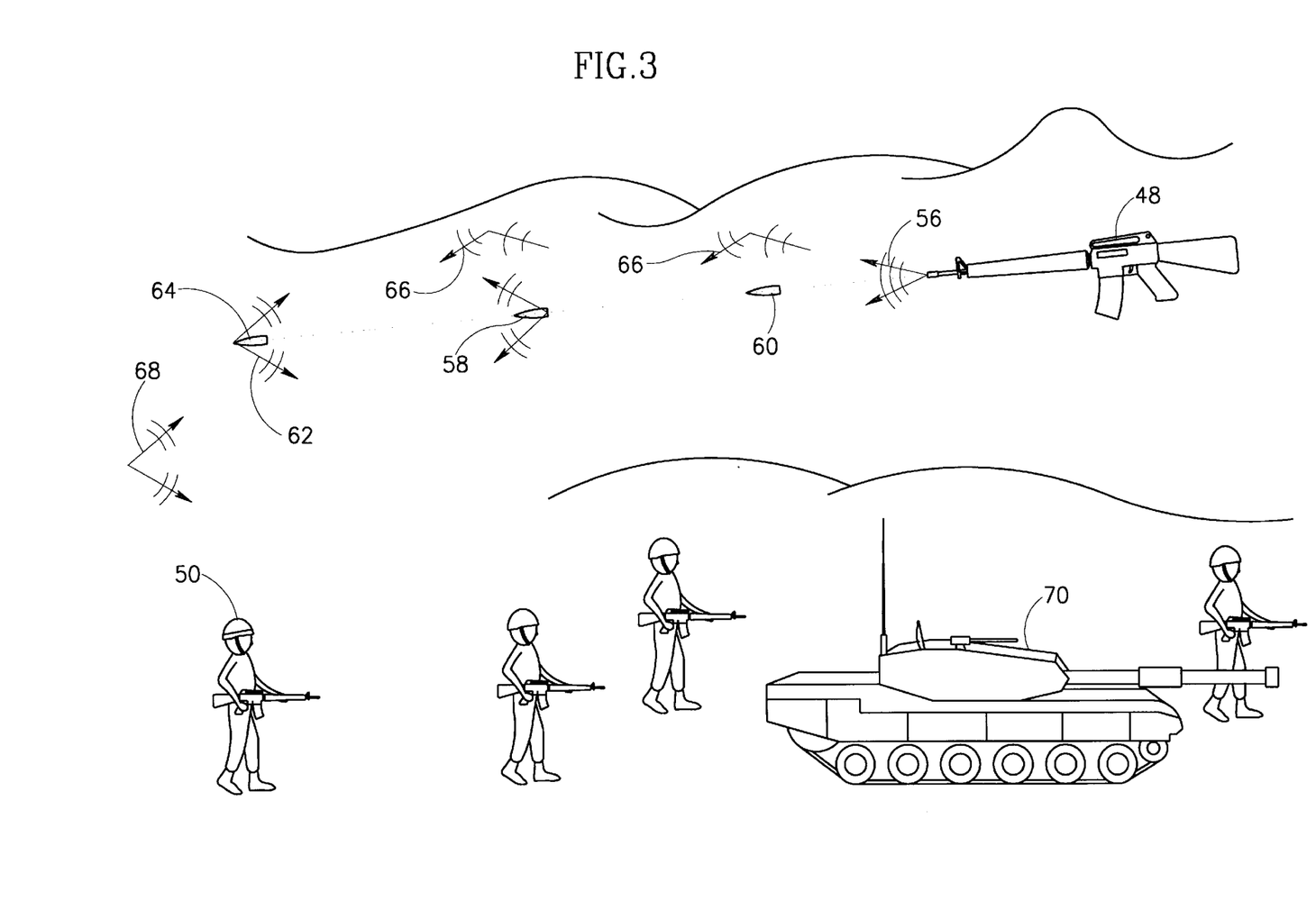
FIG. 3 is a schematic illustration of acoustic noises originating from a light weapon source of the preferred embodiment of the present invention.
Figure 4:
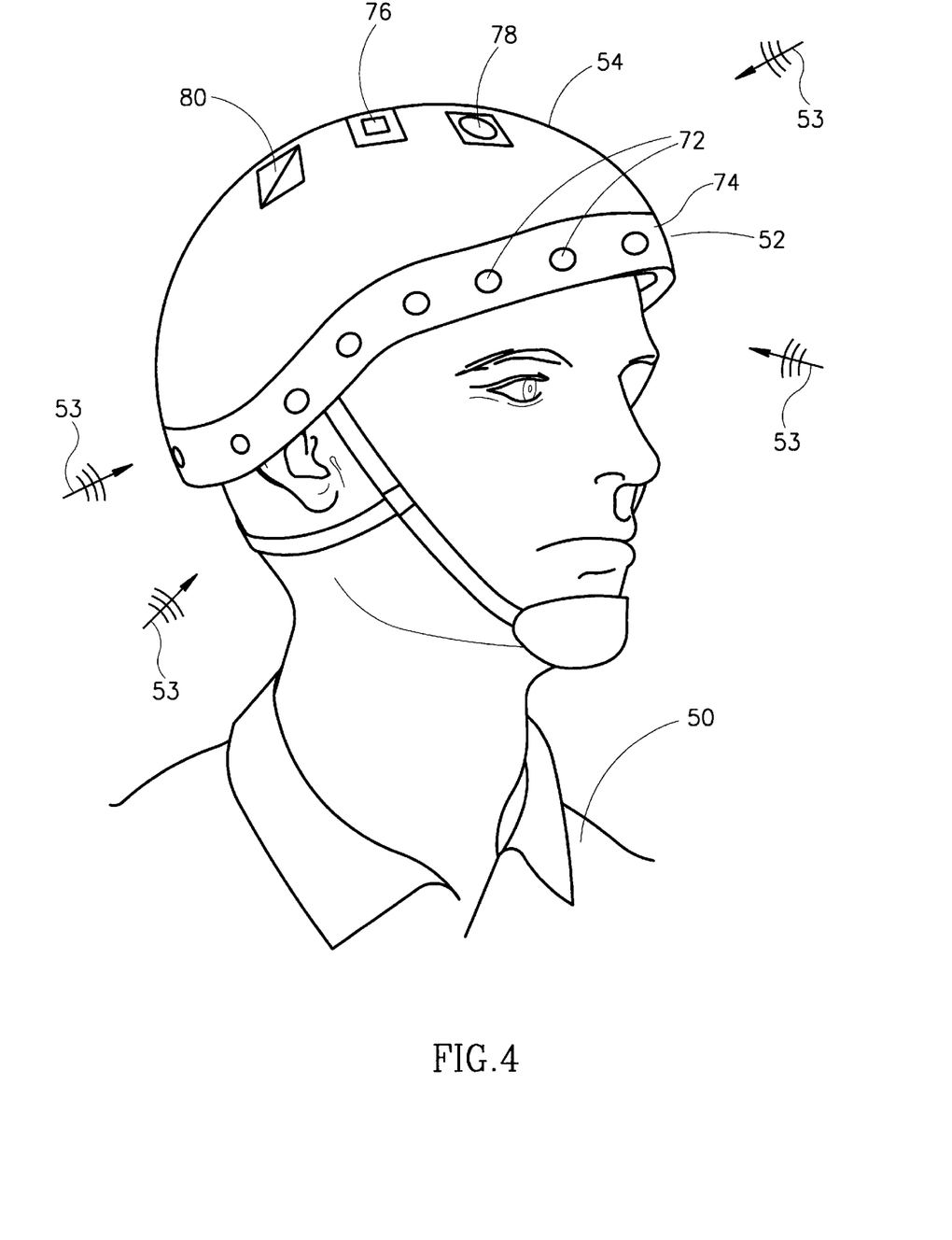
FIG. 4 is an isometric illustration of the preferred embodiment of the present invention, showing an acoustical array mounted on a hat.

Reference is now made to FIGS. 3, 4 and 5. FIG. 3 illustrates the noise activity from a light weapon 48 as an example of a noise source. FIG. 4 illustrates an acoustical array 52 mounted on a hat 54. A typical acoustic signal from a gun shot is shown in FIG. 5. As will be appreciated by persons knowledgeable in the art, the reference to light weapon 48 is given by way of example only and does not in any way limit the present invention.

Referring now to FIG. 3, a soldier 50 is shown in battlefield type conditions surrounded by a variety of noise sources, such as a tank. When a light weapon 48 is fired, it generates at least two sources of transient acoustic signals, a generally sonic muzzle boom 56 caused by the gunpowder detonation at the weapon muzzle and a generally supersonic boom 58 created and conveyed by the movement of a bullet 60. A third transient impact sound 62 is generated when the bullet 60 hits its mark 64. Echoes, generally designated 66, are also created, when supersonic boom 58, muzzle boom 56 and impact sound 62 reverberate against the terrain.

In addition to the transient acoustic signals generated by weapon 48, soldier 50 is constantly bombarded by other sounds, generally designated 68, such as wind, human voices and especially military vehicles 70.

FIG. 4 shows receiving unit 12 mounted on to a standard soldier's helmet 54. Hat 54 is shown in the shape of a helmet worn by soldier 50, but is not thereto restricted. Receiving unit 12 comprises a multitude of microphones 72 embedded within an annulus 74. As previously described with respect to FIG. 1, twelve microphones 72, each equidistantly spaced within annulus 74, are used to cover a full 360° circle. An additional elevated microphone 76 is embedded in the top of helmet 54 for assessing the elevation and allows for three-dimensional processing.

Auxiliary sensors such as a compass 78 and inclinometer 80 are also connected to acoustical array 52 so as to record and save the orientation of receiving unit 12 when a shot is heard.

Referring now to FIG. 5, an acoustic signal pattern of a typical gun shot is shown. Each type of gun shot produces its own unique pattern or "soundprint". FIG. 5 is a waveform illustrating sound amplitude (y-axis) of the different transient sounds measured against time (x-axis). Supersonic bullet boom 58 is recorded first, indicated by pattern 82, followed by impact sound 62 (of bullet 60 hitting its mark 64), indicated by pattern 84. A muzzle boom 56, indicated by pattern 86, follows thereafter. Echoes 66 and other background noises 68 are shown by the relatively minor marks, indicated by patterns 88B, 88B and 88C.

As previously described with respect to FIG. 1, acoustic signals 52 are received simultaneously and panoramically (360°) by microphones 72 (FIG. 4) and elevated microphone 76 and then converted into digitized signals by A/D converter unit 30 (FIG. 1). Processing unit 14 calculates the height of the sound source and its position relative to microphones 72.

Acoustic signals 53 are passed through filtering component 18 which filters the time history of acoustic signals 53 to isolate and extract muzzle boom 56 from other transient signals.

Beamformer 34 determines the direction of the fired gun by detecting the direction of muzzle boom 56. Passive filter 36 filters out extraneous noises, such as echoes 66 and other background noises 68. "Matched" filters 38 access database 32 and attempt to correlate the "soundprint" of the light weapon 48 with soundprints stored in database 32. The distance from receiving unit 12 to light weapon 48 is calculated by processing unit 14, from the different times taken for sonic muzzle boom 56 and supersonic bullet boom 58 to reach receiving unit 12.

Once a positive identification of the firing direction is registered, processing unit 14 sends the information regarding the direction and identity of muzzle boom 56 generated by weapon 48 to control and display unit 22.

Control and display unit 22 can be incorporated within soldier's helmet 54 for ease of viewing. If LED display 45 is selected, one of a plurality of LEDs 46 begins blinking indicating the direction of light weapon 48. Compass 78 and inclinometer 80 record and save the orientation of receiving unit 12 with respect to the gun shot. As soldier 50 turns his head, which is strapped within helmet 54, compass 78 records the changing orientation. As the soldier's head moves, the adjacent LED blinks, indicating the new position of the soldier's head relative to the identified direction is lit. When display unit 22 lines up with the beam which registered the event, LED 46 stops blinking and stays lit permanently. Soldier 50 is now facing the source of muzzle boom 56 and hence light weapon 48. After a pre-determined "live period", LED 46 will be extinguished, ready to display a new event.

As previously described with respect to FIG. 1, soldier 50 can choose to display a polar graph (not shown) instead of an LED display 45 on monitor 42.

Figure 6:
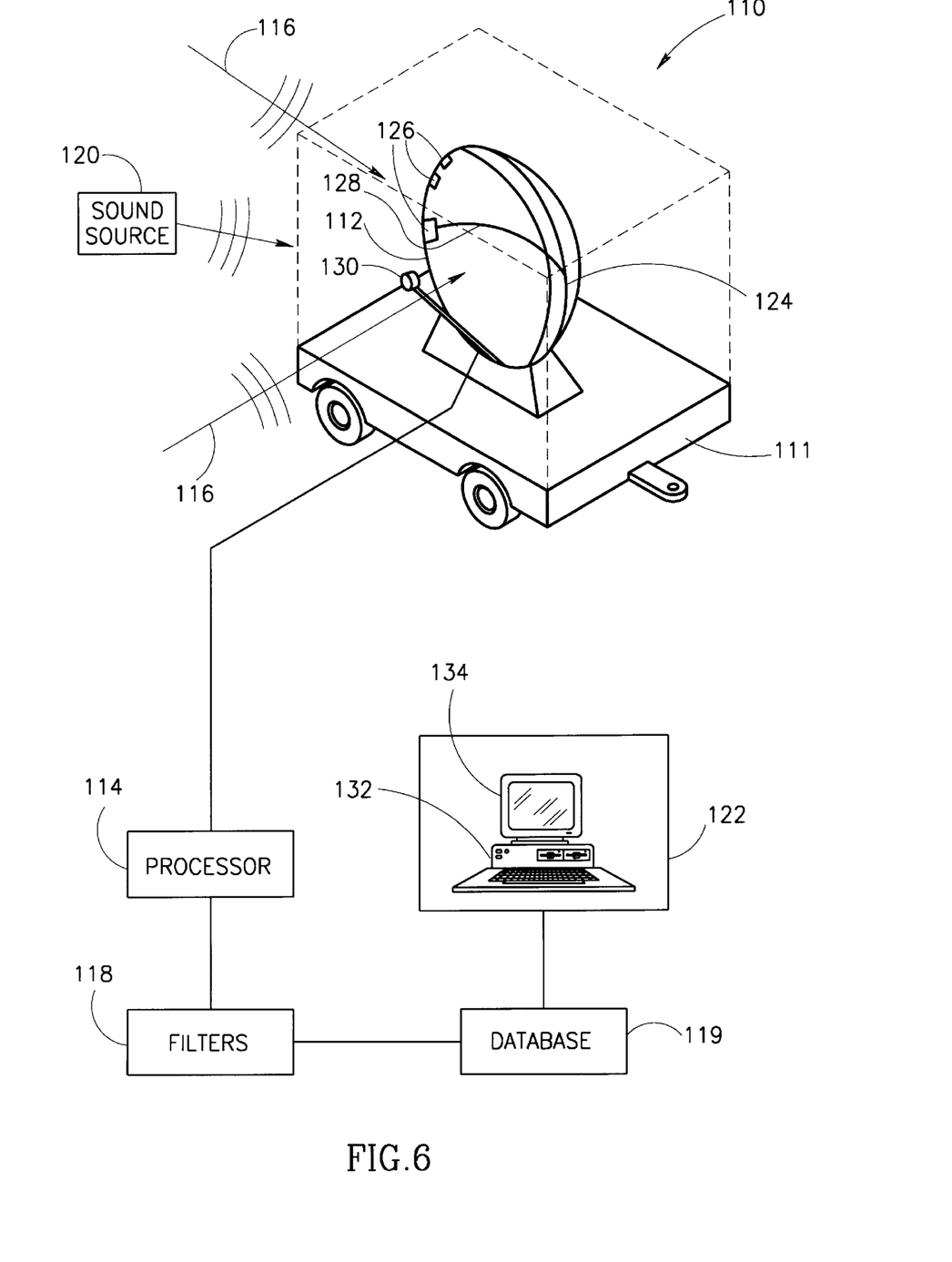
FIG. 6 is a schematic illustration of an alternative embodiment of a noise detection system for detecting the source of weapon fire.

Referring now to FIG. 6, an alternative embodiment of noise detection system 110 is shown installed on a vehicle such as a jeep, tank or other light armored vehicle 111. Noise detection system 110 can also be installed on any platform such as an airborne platform of a helicopter. Noise detection system 110 is substantially similar to that of noise detection system 10 of the preferred embodiment as described hereinbefore with reference to FIGS. 1 to 5. Thus, features of noise detection system 110, which are similar to those of noise detection system 10 will not be described in detail.

Noise detection system 110 is installed on a light vehicle 111 and comprises a receiving unit, generally designated 112, connected to a signal processing unit 114. Similar to receiving unit 12, receiving unit 112 simultaneously receives sound signals, generally designated 116, from a plurality of directions. Processing unit 114 includes a filtering component, generally designated 118, which is able to separate acoustic signals 116 from different directions and discriminate between types of sound. By reference to a database 119 of sounds of interest, processing unit 114 extracts the sound source of interest, generally designated 120 from other transient and background sound sources. A control and display unit 122 connected to processing unit 114, displays the azimuth and distance of the sound source 120 and other processed data, to the user. By rotating display unit 122, the user can accurately locate the position and "lock" on to sound source 120.

Receiving unit 112 comprises a circular antenna 124 fitted with a multiplicity of equally spaced microphones 126. Circular antenna 124 is larger in radius than annulus 26 and is collapsible for easy mounting and dismantling. Each microphone 126 is mounted at the end of a radial arm 128, for example about 60", which, when erected forms a ray-like pattern. An additional elevation microphone 130 is mounted on to light vehicle 111 so that the elevation of sound source 120 can be determined.

As previously described with respect to FIG. 1, acoustic signals 116 are received simultaneously and panoramically (360°) by circular antenna 124 and elevated microphone 130 and then converted into digitized signals by A/D converter unit 30. Processing unit 114 calculates the height of the sound source.

Acoustic signals 116 are passed through filtering component 118 which filters the time history of acoustic signals 116 to isolate and extract sound source 120 from other transient signals.

Since noise detection system 110 is installed on a light vehicle 111, it is necessary to eliminate any noise created by light vehicle 111. In this embodiment, filtering component 118 comprises an adaptive and active noise control filter (not shown) in place of passive filter 36 for canceling vehicle noise. The active noise filter allows the operator to select which noises and frequencies he wishes to cancel.

Once a positive identification of sound source 120 is registered, processing unit 114 sends the information regarding the direction and identity of sound source 120 to control and display unit 122. As noise detection system 110 is installed on a light vehicle 111, display unit 122 can be larger and can comprise a computer 132, such as a personal computer (PC), comprising a processing unit and keyboard (not shown) connected to a screen display monitor 134, larger than monitor 42, and optionally a printer (not shown). A polar graph display, showing the direction of the last sound source 120, is displayed on monitor 134. In addition, computer 132 can be configured to allow the operator to display other data such as the azimuths of the events shown.

Where sound source 120 generates a continuous signal, such as an ambulance siren, only the direction of sound source 120 is displayed on monitor 134. Where sound source 120 is a weapon, at least two different sound signals are generated. As hereinbefore described, the distance from receiving unit 112 to weapon sound source 120 can be calculated by processing unit 114, from the different times taken for the sonic muzzle boom and supersonic bullet boom to reach receiving unit 112.

As will be appreciated by persons knowledgeable in the art, the various embodiments hereinbefore referred are given by way of example only and do not in any way limit the present invention.

Those skilled in the art will be readily appreciate that various changes, modifications and variations may be applied to the preferred embodiments without departing from the scope of the invention as defined in and by the appended claims.

We claim:

1. A noise detection system comprising:
   a. a receiving unit comprising a three-dimensional acoustical array for generally simultaneously receiving a multiplicity of sound signals from different directions, said sound signals including at least one sound source of interest, wherein said acoustical array comprises an antenna fitted with a multiplicity of microphones located in a first plane and at least one elevated microphone located in a second plane above said first plane;
   b. a processing unit connected to said receiving unit, for simultaneously processing said sound signals, said processing unit comprising:
      i. a three-dimensional spatial filter for identifying the elevation and azimuth of each of said signals, the spatial filter operating in the frequency domain over the full frequency spectrum of interest when the identity of the signal source is unknown and the acoustical signature of the signal source is known, and operating in the time domain when an impulse sound is identified;
      ii. a sound database containing a multiplicity of soundprints of sound sources of interest;
      iii. means for classifying said sound signals with said soundprints, said classifying means comprising at least one matched filter for adaptively filtering said sound signals and matching said signals with sounds of interest stored in said sound database;
      v. means for producing the azimuth and elevation of said classified sound signals; and
      vi. a user interface unit connected to said processing unit, for indicating to the user the azimuths and elevations of said classified sound signals.

2. The noise detection system according to claim 1 wherein said multiplicity of microphones are generally equally spaced within said antenna.

3. The noise detection system according to claim 1 wherein said processing unit further comprises filtering means for filtering extraneous noise signals received by said acoustical array.

4. The noise detection system according to claim 1 wherein said acoustical array is attached to a head covering.

5. The noise detection system according to claim 4 wherein said head covering further comprises a direction indicator device for indicating the orientation of said acoustical array about a horizontal axis.

6. The noise detection system according to claim 4 wherein said head covering further comprises an angle indicating device for indicating the angle of inclination of said acoustical array.

7. The noise detection system according to claim 1 wherein said spatial filter comprises an annular arrangement of a multiplicity of directional filters.

8. The noise detection system according to claim 1 wherein said user interface unit comprises selector means for selecting from a plurality of displaying elements.

9. The noise detection system according to claim 8 wherein one of said display elements is a plurality of light emitting diodes operative to indicate said identified azimuth of said classified sound source.

10. The noise detection system according to claim 8 wherein one of said display elements includes means for displaying said identified azimuth and elevation of said classified sound source.

11. The noise detection system according to claim 1 wherein said acoustical array is mounted onto a mobile platform.

12. The noise detection system according to claim 1 wherein said spatial filter further comprises means for searching for a multiplicity of frequencies within a pre-determined time period.

13. The noise detection system according to claim 1 wherein said spatial filter further comprises means for searching for said sound signal within a pre-determined time period, wherein said soundprint of said sound signal is known.

14. A method for detecting noise comprising the steps of:
   a. simultaneously receiving a multiplicity of sound signals from different directions through a three-dimensional acoustical array, said sound signals including at least one sound source of interest, wherein said acoustical array comprises an antenna fitted with a multiplicity of microphones located in a first plane and at least one elevated microphone located in a second plane above said first plane;
   b. processing said sound signals comprising the steps of:
      i. spatially filtering said sound signals;
      ii. identifying the elevation and azimuth of each of said sound signals;
      iii. classifying the soundprint of said sound signals from a sound database containing a multiplicity of soundprints of interest, by adaptively filtering said sound signals and matching said signals with sounds of interest stored in said sound database;
      iv. providing the azimuth and elevation of said classified sound signals; and
   c. indicating the azimuths and elevations of said classified sound signals.

15. The method for detecting noise according to claim 14 and including the step of indicating the angle of inclination of said acoustical array wherein said step of indicating utilizes measurements from an angle inclination device associated with said acoustical array.

16. The method for detecting noise according to claim 14 wherein said step of identifying comprises the step of searching for a multiplicity of frequencies within a pre-determined time period.

17. The method for detecting noise according to claim 14 wherein said step of identifying comprises the step of searching for said sound signal, within a pre-determined time period, wherein said soundprint of said sound signal is known.

18. The method for detecting noise according to claim 14 wherein said step of processing said sound signals further comprises the step of filtering extraneous noise signals.

19. A method for detecting noise comprising the steps of:
   a. simultaneously receiving a multiplicity of sound signals from different directions through a three-dimensional acoustical array, said sound signals including at least one sound source of interest, wherein said acoustical array comprises an antenna fitted with a multiplicity of microphones located in a first plane and at least one elevated microphone located in a second plane above said first plane;

b. simultaneously processing said sound signals comprising the steps of:
   i. spatially filtering said sound signals in the frequency domain over the full frequency spectrum of interest when the identity of the signal source is unknown and the acoustical signature of the signal source is known, and operating in the time domain when an impulse sound is identified:
   ii. identifying the elevation and azimuth of each of said sound signals;
   iii. classifying the soundprint of said sound signals from a sound data base containing a multiplicity of soundprints of interest, by adaptively filtering said sound signals and matching said signals with sounds of interest stored in said sound database;
   iv. providing the azimuth and elevations of said classified sound signals; and c. indicating the azimuths and elevations of said classified sound signals.

* * * * *